United States Patent
Chevalier

(10) Patent No.: US 11,946,537 B2
(45) Date of Patent: Apr. 2, 2024

(54) DAMPED ISOLATION PULLEY HAVING AN ELECTRO-ADHESIVE CLUTCH

(71) Applicant: AMERICAN AXLE & MANUFACTURING, INC., Detroit, MI (US)

(72) Inventor: Steven Chevalier, Canton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 85 days.

(21) Appl. No.: 17/832,826

(22) Filed: Jun. 6, 2022

(65) Prior Publication Data
US 2022/0299100 A1 Sep. 22, 2022

Related U.S. Application Data

(63) Continuation of application No. PCT/US2020/061506, filed on Nov. 20, 2020.

(60) Provisional application No. 62/945,416, filed on Dec. 9, 2019.

(51) Int. Cl.
| | |
|---|---|
| F16H 55/36 | (2006.01) |
| F16D 27/14 | (2006.01) |
| F16F 15/12 | (2006.01) |
| F16F 15/126 | (2006.01) |

(52) U.S. Cl.
CPC ............. *F16H 55/36* (2013.01); *F16D 27/14* (2013.01); *F16F 15/126* (2013.01); *F16H 2055/366* (2013.01)

(58) Field of Classification Search
CPC .... F16H 55/36; F16H 2055/366; F16D 27/12; F16D 27/14; F16F 15/126
See application file for complete search history.

(56) References Cited

U.S. PATENT DOCUMENTS

| | | | |
|---|---|---|---|
| 880,266 A | * | 2/1908 | Ast .......................... 192/84.951 |
| 2,897,934 A | | 8/1959 | Fitch |
| 2,923,390 A | | 2/1960 | Fitch |
| 3,002,596 A | | 10/1961 | Fitch |

(Continued)

FOREIGN PATENT DOCUMENTS

| | | | |
|---|---|---|---|
| DE | 202018000140 U1 | * | 3/2018 |
| DE | 202022106941 U1 | * | 2/2023 |

(Continued)

OTHER PUBLICATIONS

PCT International Search Report dated Mar. 2, 2021 for corresponding PCT application No. PCT/US20208/061506, filed Nov. 20, 2020.

*Primary Examiner* — Adam D Rogers
(74) *Attorney, Agent, or Firm* — Reising Ethington P.C.

(57) ABSTRACT

A damped isolation pulley having a hub, a pulley disposed concentrically about the hub, an isolation spring, an inertia ring and an electro-adhesive clutch. The hub is configured to be mounted to a crankshaft of an internal combustion engine. The isolation spring is formed of an elastomeric material and couples the pulley to the hub. The inertia ring is resiliently coupled to the hub and is rotationally decoupled from the pulley. The electro-adhesive clutch has a clutch input member that is coupled to the pulley and can be operated to form an alternate torque path between the pulley and the hub that does not include the isolation spring.

26 Claims, 4 Drawing Sheets

(56) References Cited

U.S. PATENT DOCUMENTS

| | | | | |
|---|---|---|---|---|
| 6,702,681 | B1* | 3/2004 | Ochs | F16H 55/36 |
| | | | | 464/7 |
| 9,638,268 | B2* | 5/2017 | Bartholomew | F16D 27/14 |
| 9,850,963 | B2* | 12/2017 | Konishi | F16D 27/14 |
| 9,989,103 | B2* | 6/2018 | Antchak | F16H 55/36 |
| 10,024,415 | B2* | 7/2018 | Schneider | F16D 41/206 |
| 11,796,046 | B2* | 10/2023 | Steiger | F16D 7/044 |
| 2012/0015768 | A1 | 1/2012 | Serkh et al. | |
| 2012/0094791 | A1* | 4/2012 | Lee | F16H 55/36 |
| | | | | 474/94 |
| 2016/0069418 | A1 | 3/2016 | Schneider et al. | |
| 2018/0142738 | A1 | 5/2018 | Antchak et al. | |

FOREIGN PATENT DOCUMENTS

| | | |
|---|---|---|
| JP | 2013007437 A | 10/2015 |
| KR | 10-2019-0019399 A | 2/2019 |

* cited by examiner

DAMPED ISOLATION PULLEY HAVING AN ELECTRO-ADHESIVE CLUTCH

CROSS-REFERENCE TO RELATED APPLICATIONS

This application is a bypass continuation of International Patent Application No. PCT/US2020/061506 filed Nov. 20, 2020, which claims the benefit of U.S. Provisional Application No. 62/945,416 filed Dec. 9, 2019. The disclosure of each of the above-referenced applications is incorporated by reference as if fully set forth in detail herein.

FIELD

The present disclosure relates to a damped isolation pulley having an electro-adhesive clutch.

BACKGROUND

This section provides background information related to the present disclosure which is not necessarily prior art.

Belt-starter-generator (BSG) systems utilize a belt drive system between a crankshaft of an internal combustion engine and a motor-generator to transmit rotary power from the engine to the motor-generator to drive the motor-generator to produce electrical power, and to transmit rotary power from the motor-generator to the engine to start the engine. The belt of the belt drive system is typically mounted to a damped isolation pulley that is driven by the crankshaft of the engine. The damped isolation pulley typically includes a hub, which is fixedly coupled to the crankshaft, a pulley, which is coupled to the hub via an isolation spring, an inertia ring, and a damping ring that couples the inertia ring to the hub. The isolation spring is typically formed of a relatively soft elastomeric material that helps to isolate the crankshaft from various accessories (primarily the motor-generator) that are driven by the belt drive system when rotary power is input to the belt drive system by the crankshaft. The inertia ring and the damping ring cooperate to form a torsional vibration damper that helps to attenuate torsional vibration generated by various components of the engine.

In situations in which a relatively large amount of torque is needed for starting the engine, it may be possible to over stress the elastomer material of the elastomeric isolation spring when rotary power produced by the motor-generator is transmitted through a belt to the pulley of the damped isolation pulley. Accordingly, there remains a need in the art for an improved damped isolation pulley.

SUMMARY

This section provides a general summary of the disclosure, and is not a comprehensive disclosure of its full scope or all of its features.

In one form, the present disclosure provides a damped isolation pulley having a hub, a pulley disposed concentrically about the hub, an isolation spring, an inertia ring and an electro-adhesive clutch. The hub is configured to be mounted to a crankshaft of an internal combustion engine. The isolation spring couples the pulley to the hub. The inertia ring is resiliently coupled to the hub and is rotationally de-coupled from the pulley. The electro-adhesive clutch has a clutch input member that is coupled to the pulley and can be operated to form an alternate torque path between the pulley and the hub that does not include the isolation spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
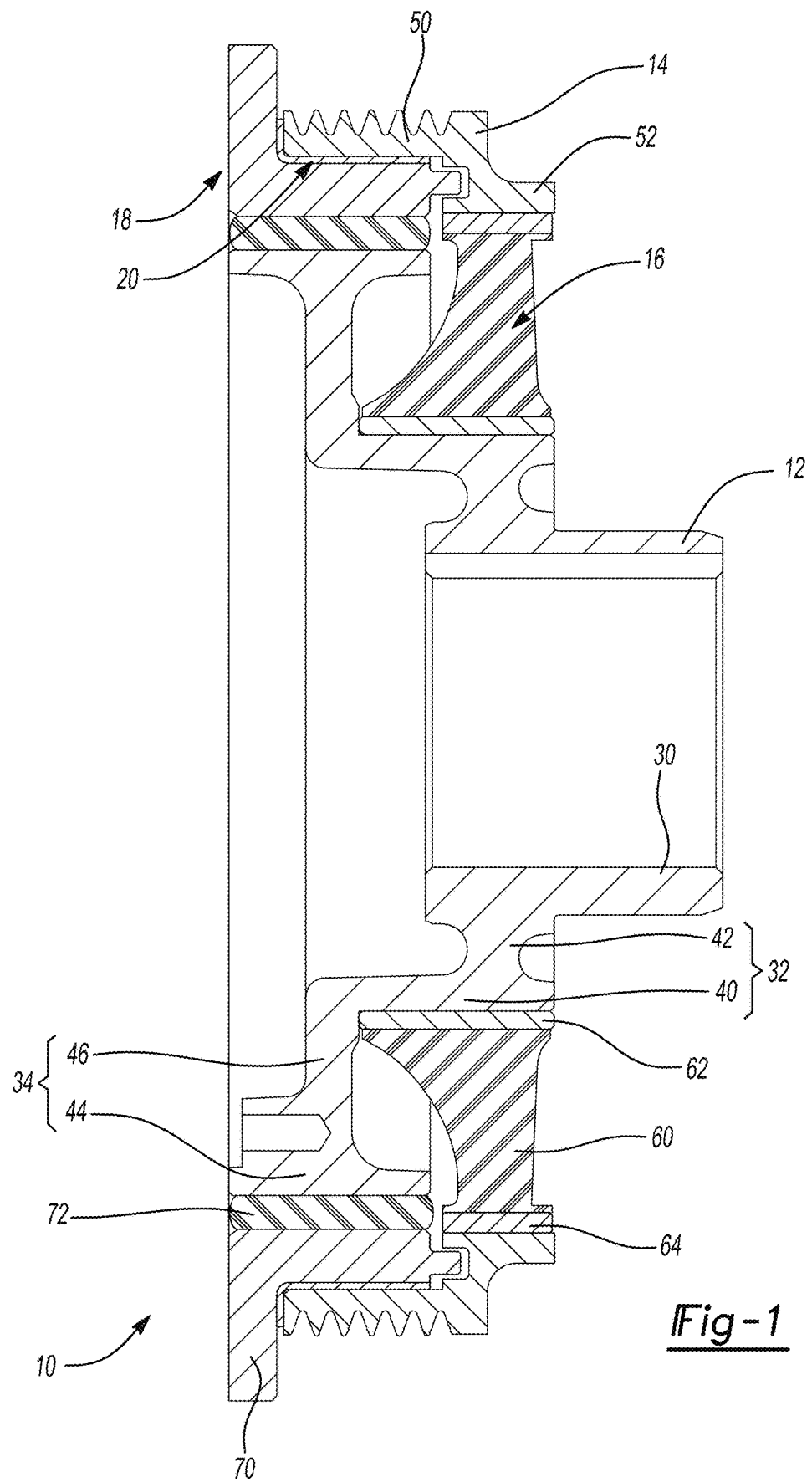
FIG. 1 is a sectional view of an exemplary damped isolation pulley constructed in accordance with the teachings of the present disclosure.

With reference to FIG. 1, an exemplary damped isolation pulley constructed in accordance with the teachings of the present disclosure is generally indicated by reference numeral 10. The damped isolation pulley 10 can include a hub 12, a pulley 14, an isolation spring 16, a torsional vibration damper 18, and an electro-adhesive clutch 20.

The hub 12 can include a central hub portion 30, a first pulley mount portion 32 and a damper mount portion 34. The central hub portion 30 is configured to be mounted to a crankshaft (not shown) of an internal combustion engine (not shown) in a conventional manner. In the particular example shown, the central hub portion 30 has a tubular or sleeve-like configuration that is configured to slide over or be pressed onto the crankshaft and optionally a threaded fastener (not shown) can be employed to generate a clamping force that is transmitted axially through the central hub portion 30 to the crankshaft to fixedly couple the hub 12 to the crankshaft. The first pulley mount portion 32 can include a first annular mount member 40 and a first circumferentially extending rib 42 that extends radially between the central hub portion 30 and the first annular mount member 40. The damper mount portion 34 can include a second annular mount member 44 and a second circumferentially extending rib 46 that extends radially between the first and second annular mount members 40 and 44. The second annular mount member 44 is disposed concentrically about (i.e., radially outwardly of) the first annular mount member 40.

The pulley 14 is disposed concentrically about the hub 12 and can include a pulley member 50 and a second pulley mount portion 52. The pulley member 50 is annular in shape with a radially outer surface and a radially inner surface. The radially outer surface is constructed with a profile that is configured to engage a belt (not shown) of a belt drive system (not shown) that can include a motor-generator (not shown). The second pulley mount portion 52 is fixedly coupled to the pulley member 50 and extends radially inward therefrom.

The isolation spring 16 can be at least partly formed of one or more suitable, relatively soft elastomers that is/are cohesively bonded to an outer circumferential surface of the first pulley mount portion 32 and to an inner circumferential surface of the second pulley mount portion 52. Alternatively, the isolation spring 16 could comprise one or more springs, such as helical compression springs. The isolation spring 16 fixedly and rotationally couples the pulley 14 to the hub 12 but permits a modicum of relative rotation between the pulley 14 and the hub 12. Configuration in this manner is intended to isolate the hub 12 (and crankshaft) from torsional vibration and noise generated from the accessories that are driven by the belt drive system and transmitted through the belt to the pulley 14. In the example provided, the isolation spring 16 includes a central member 60, a first ring member 62 and a second ring member 64. The first and second ring members 62 and 64 can be formed of an appropriate material, such as steel, that permits the coupling of the isolation spring to the first and second pulley mount portions 32 and 52 in a desired manner, such as press-fitting. The central member 60 can be formed of a resilient elastomeric material and can be fixedly coupled to the first and second ring members 62 and 64 in any desired manner, such as by cohesive bonding.

The torsional vibration damper 18 can be conventional in its construction and can be any type of torsional vibration damper, such as a viscous damper. In the example provided, the torsional vibration damper 18 includes an inertia ring 70 and an elastomeric ring 72 that resiliently couples the inertia ring 70 to the damper mount portion 34. In the example provided, the elastomeric ring 72 is cohesively bonded to an inner circumferential surface of the inertia ring 70 and to an outer circumferential surface of the second annular mount member 44. As the torsional vibration damper 18 is configured to damp torsional vibration produced by the internal combustion engine during the operation of the engine, the inertia ring 70 is rotationally decoupled from the pulley 14.

Figure 2:
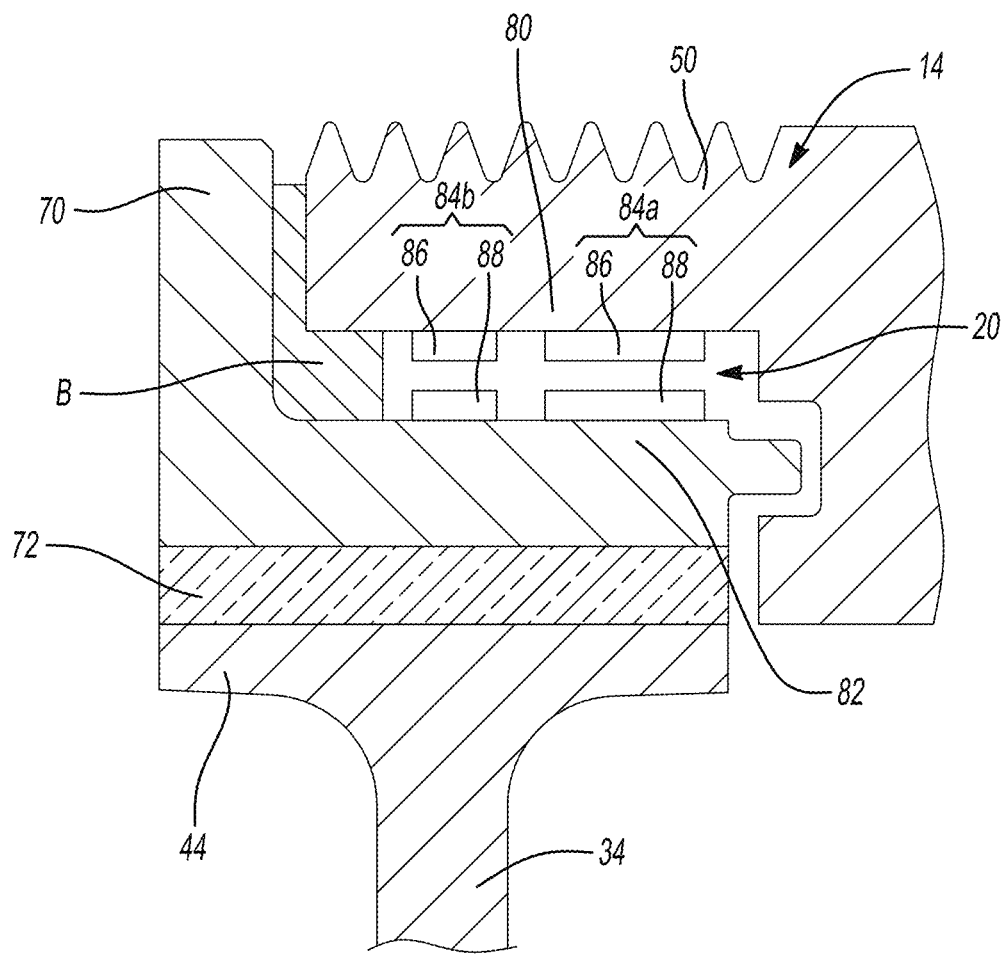
FIG. 2 is an enlarged portion of FIG. 1.

In FIGS. 1 and 2, the electro-adhesive clutch 20 is selectively operable to from an alternate torque path between the pulley 14 and the hub 12 that does not include the isolation spring 16. This alternate torque path can be employed, for example, when rotary power is to be transmitted from the pulley 14 to the hub 12 to start the internal combustion engine without transmitting this rotary power through (and potentially over-stressing) the isolation spring 16. This alternate torque path can be sized to carry all or a portion of the rotary load (i.e., torque) that is to be transmitted between the pulley 14 and the hub 12. The electro-adhesive clutch 20 can have a clutch input member 80, which can be rotationally coupled to the pulley 14, and a clutch output member 82 that can be rotationally coupled to the hub 12, either directly or via another component, such as the inertia ring 70. In the example shown, the clutch input member 80 is a portion of the pulley member 50, while the clutch output member 82 is a portion of the inertia ring 70.

With specific reference to FIG. 2, the electro-adhesive clutch 20 can be disposed radially between the pulley 14 and the inertia ring 70 and includes one or more sets 84a, 84b of discrete electro-adhesive clutch segments. Each set 84a, 84b includes a first clutch segment 86, which is coupled for rotation with the pulley 14, and a second clutch segment 88 that is coupled for rotation with the hub 12 (i.e., directly coupled to the inertia ring 70 in the example provided). In the example provided, each of the first and second clutch segments 86 and 88 is a circumferentially-extending strip that is fixedly coupled to the radially inner surface of the pulley 14 and a radially outer surface of the inertia ring 70, respectfully. If desired, the electro-adhesive clutch 20 can be configured such that each set 84a, 84b can be energized independently (i.e., set 84a alone, or set 84b alone, or sets 84a and 84b together) so as to vary a torque capacity of the electro-adhesive clutch 20. Moreover, if the sets 84a, 84b are capable of being energized independently, it may be desirable in some situations that the sets 84a, 84b are sized differently so that the torque-carrying capacity of each of the sets 84a, 84b is different. One or more conventional bushings B can be employed to provide radial and/or axial support between the inertia ring 70 and the pulley member 50.

Electrical power can be transmitted from an appropriate power source, such as the vehicle battery (not shown), through a wire harness (not shown) to a slip ring (not shown) that is constructed in a conventional and well-known manner. Electric leads (not shown) can be routed from the slip ring to the first and second clutch segments 86 and 88 in each of the sets 84a and 84b of discrete electro-adhesive clutch segments.

Figure 3:
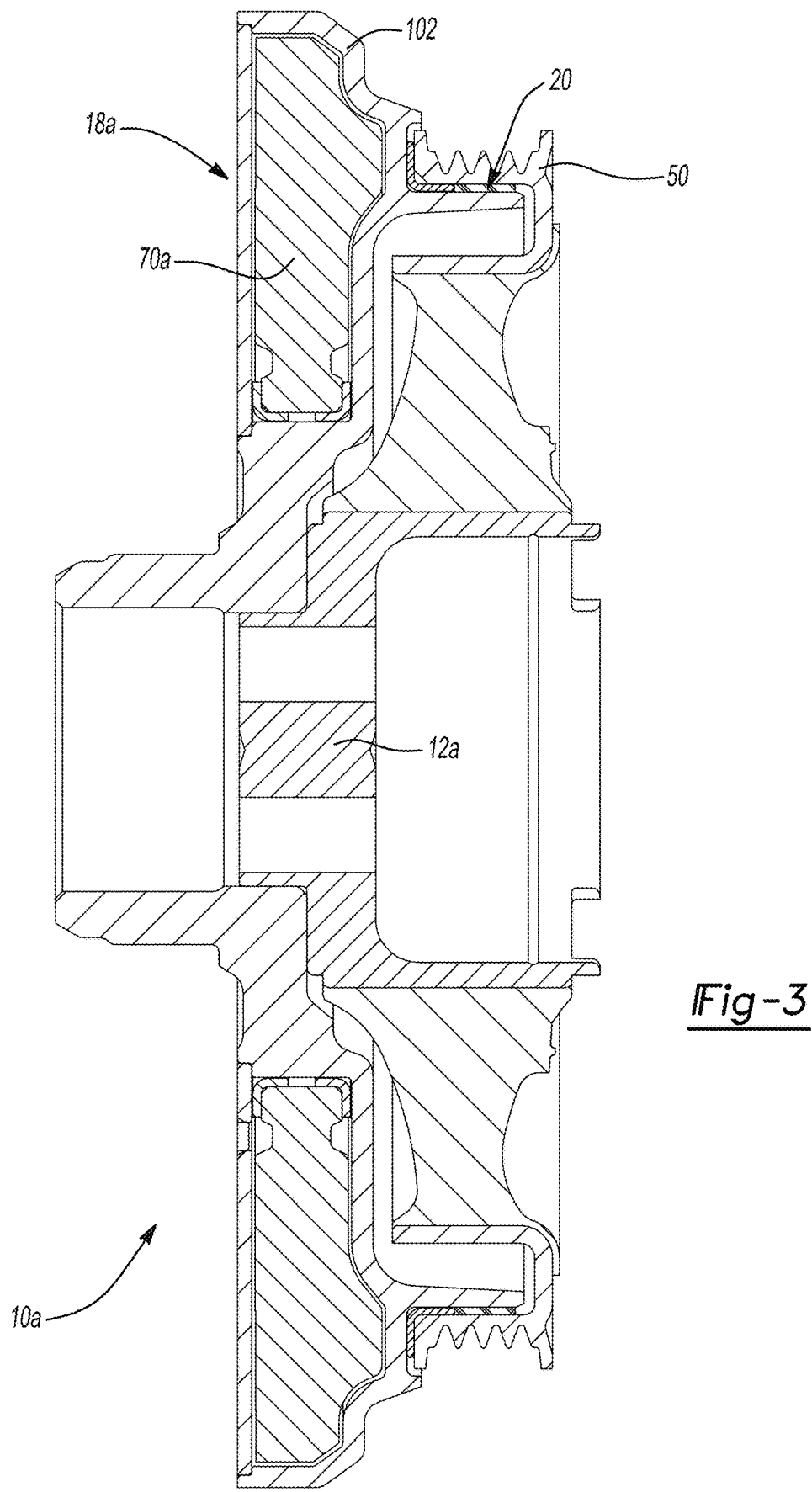
FIG. 3 is a sectional view of a second damped isolation pulley constructed in accordance with the teachings of the present disclosure.

In FIG. 3, a second damped isolation pulley constructed in accordance with the teachings of the present disclosure is generally indicated by reference numeral 10a. The damped isolation pulley 10a is generally similar to that which is described above, except that the torsional vibration damper 18a is a viscous damper having an inertia ring 70a and a viscous fluid (not specifically shown) that are disposed in a damper housing 102. In this example, the electro-adhesive clutch 20 is selectively operable for rotationally coupling the pulley 50 to the housing 102 to form an alternate torque path between the pulley 50 and the hub 12a.

While the damped isolation pulley has been illustrated and described as having an electro-adhesive clutch with one or more sets of first and second clutch segments that are configured as concentric bands, it will be appreciated that the first and second clutch segments can be additionally or alternatively oriented in a different manner. For example, the pulley could be constructed with another circumferentially extending rib that extends radially inward from the pulley member and which is spaced apart from the second pulley mount along a rotational axis of the hub. Each of the first clutch segments can be shaped as an annulus or an annular segment and can be fixedly coupled to this new circumferentially extending rib. It will be appreciated that the first clutch segments of the first set of discrete clutch segments are disposed circumferentially between adjacent first clutch segments of the second set of discrete clutch segments. Similarly, each of the second clutch segments is shaped an annulus or as an annular segment and is fixedly coupled to the second circumferentially extending rib on the hub. The second clutch segments of the first set of discrete clutch segments are disposed circumferentially between adjacent second clutch segments of the second set of discrete clutch segments. It will be appreciated that the first and second clutch segments are disposed parallel to one another, extend radially between the hub and the pulley, and are spaced apart from one another along the rotational axis of the hub.

Figure 4:
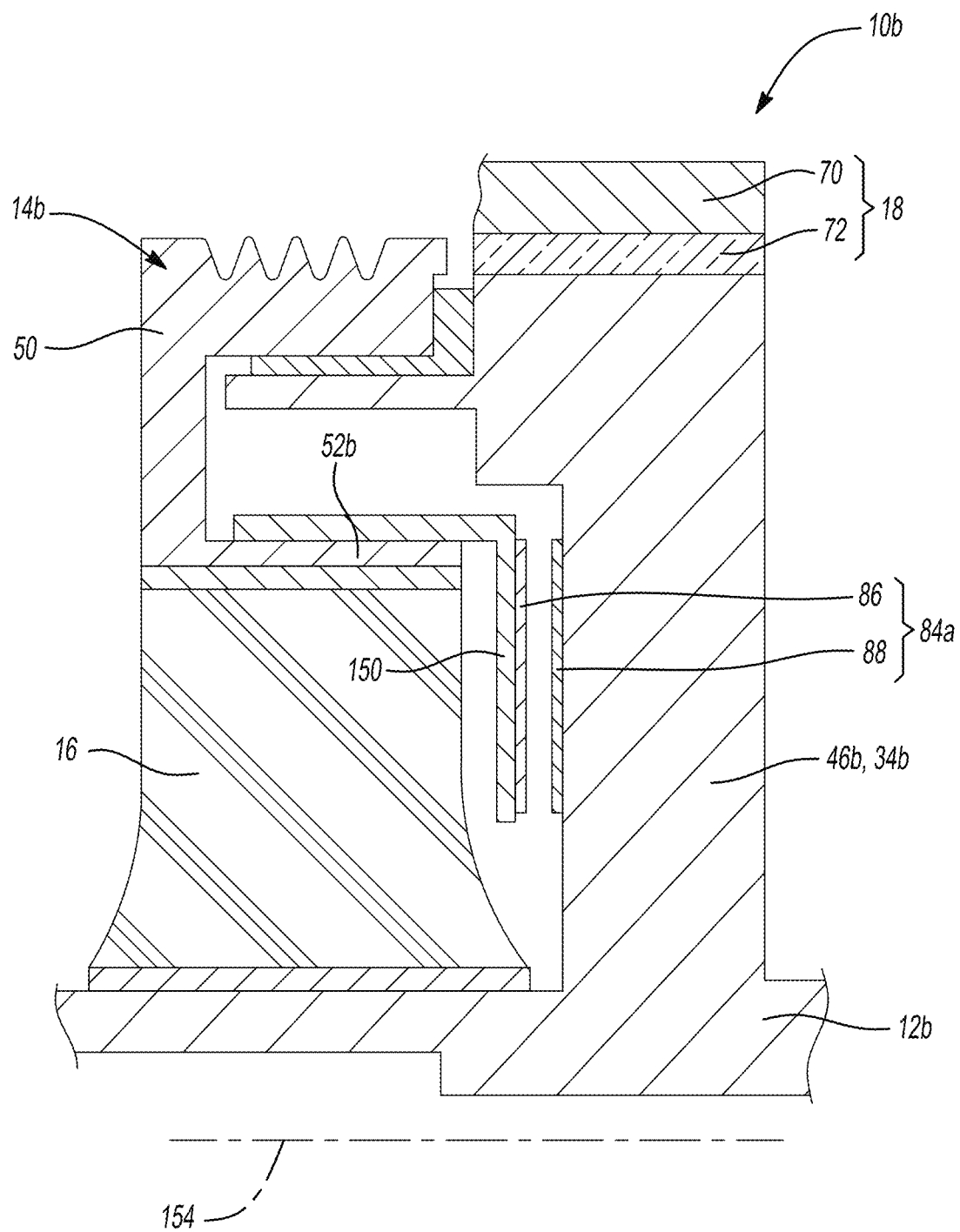
FIG. 4 is a section view of a third damped isolation pulley constructed in accordance with the teachings of the present disclosure.

While the damped isolation pulley has been illustrated and described as having an electro-adhesive clutch with one or more sets of first and second clutch segments that are configured as concentric bands, it will be appreciated that the first and second clutch segments can be additionally or alternatively oriented in a different manner. With reference to FIG. 4, a portion of an alternatively configured damped isolation pulley 10b is shown. In this example, the pulley 14b includes a third circumferentially extending rib 150 that extends radially inward from the second pulley mount portion 52b and which is spaced apart from the isolation spring 16 along a rotational axis 154 of the hub 12b. Each of the first clutch segments 86 can shaped as an annulus or an annular segment and is fixedly coupled to the third circumferentially extending rib 150. If multiple sets of clutch segments are employed, the first clutch segments 86 of the first set 84a can be disposed circumferentially between adjacent first clutch segments (not shown) of the second set (not shown) or the first clutch segments 86 of the first set 84a can be disposed concentrically within or about the first clutch segments of the second set. Similarly, each of the second clutch segments 88 can be shaped as an annulus or as an annular segment and is fixedly coupled to the second circumferentially extending rib 46b of the damper mount portion 34b of the hub 12b. If multiple sets of clutch segments are employed, the second clutch segments 88 of the first set 84a can be disposed circumferentially between adjacent second clutch segments (not shown) of the second set (not shown), or the second clutch segments 888 of the first set 84a can be disposed concentrically within or about the second clutch segments of the second set. Regardless of the configuration, it will be appreciated that the first and second clutch segments 86 and 88 of a given set of clutch plates are disposed parallel to one another, extend radially between the hub 12b and the pulley 14b, and are spaced apart from one another along the rotational axis 154 of the hub 12b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A damped isolation pulley comprising:
 a hub that is adapted to be mounted to a crankshaft of an internal combustion engine;
 a pulley disposed concentrically about the hub;
 an isolation spring coupling the pulley to the hub;
 a torsional vibration damper rotationally coupled to the hub and rotationally decoupled from the pulley; and
 an electro-adhesive clutch having a clutch input member that is coupled to the pulley, the electro-adhesive clutch being selectively operable for forming an alternate torque path between the pulley and the hub that does not include the isolation spring;
 wherein the electro-adhesive clutch comprises a set of discrete electro-adhesive clutch segments having a first clutch segment, which is coupled for rotation with the pulley, and a second clutch segment, which is coupled for rotation with the hub; and
 wherein the first clutch segment is disposed concentrically about the second clutch segment.

2. The damped isolation pulley of claim 1, wherein the electro-adhesive clutch has a clutch output member that is coupled to the torsional vibration damper.

3. The damped isolation pulley of claim 2, wherein the torsional vibration damper includes an inertia ring and wherein the clutch output member is fixedly coupled to the inertia ring.

4. The damped isolation pulley of claim 1, wherein the torsional vibration damper comprises an inertia ring and a spring element that couples the inertia ring to the hub.

5. The damped isolation pulley of claim 4, wherein the spring element comprises at least one elastomeric element.

6. The damped isolation pulley of claim 1, wherein the isolation spring is at least partly formed of an elastomeric material.

7. A damped isolation pulley comprising:
 a hub that is adapted to be mounted to a crankshaft of an internal combustion engine;
 a pulley disposed concentrically about the hub;
 an isolation spring coupling the pulley to the hub;
 a torsional vibration damper rotationally coupled to the hub and rotationally decoupled from the pulley; and
 an electro-adhesive clutch having a clutch input member that is coupled to the pulley, the electro-adhesive clutch being selectively operable for forming an alternate torque path between the pulley and the hub that does not include the isolation spring;
 wherein the electro-adhesive clutch comprises a plurality of sets of discrete electro-adhesive clutch segments, wherein each set of discrete electro-adhesive clutch segments comprises a first clutch segment, which is coupled for rotation with the pulley, and a second clutch segment, which is coupled for rotation with the hub, and wherein the sets of discrete electro-adhesive clutch segments are selectively energize-able to vary a torque capacity of the electro-adhesive clutch.

8. The damped isolation pulley of claim 7, wherein the electro-adhesive clutch has a clutch output member that is coupled to the torsional vibration damper.

9. The damped isolation pulley of claim 8, wherein the torsional vibration damper includes an inertia ring and wherein the clutch output member is fixedly coupled to the inertia ring.

10. The damped isolation pulley of claim 7, wherein the torsional vibration damper comprises an inertia ring and a spring element that couples the inertia ring to the hub.

11. The damped isolation pulley of claim 10, wherein the spring element comprises at least one elastomeric element.

12. The damped isolation pulley of claim 7, wherein the first clutch segment and the second clutch segment of a first one of the sets of discrete electro-adhesive clutch segments are disposed parallel to one another, extend radially between the hub and the pulley, and are spaced apart from one another along a rotational axis of the hub.

13. The damped isolation pulley of claim 12, wherein the first clutch segment and the second clutch segment of the first one of the sets of discrete electro-adhesive clutch segments is shaped as a segment of an annulus.

14. The damped isolation pulley of claim 7, wherein the first clutch segment of a first one of the sets of discrete electro-adhesive clutch segments are disposed concentrically about the second clutch segment of the first one of the sets of discrete electro-adhesive clutch segments.

15. The damped isolation pulley of claim 7, wherein the isolation spring is at least partly formed of an elastomeric material.

16. The damped isolation pulley of claim 7,
 wherein the first and second clutch segments are disposed parallel to one another, extend radially between the hub and the pulley, and are spaced apart from one another along a rotational axis of the hub.

17. The damped isolation pulley of claim 16, wherein each of the first and second clutch segments is shaped as a segment of an annulus or a circle.

18. The damped isolation pulley of claim 7,
 wherein the first clutch segment is disposed concentrically about the second clutch segment.

19. A damped isolation pulley comprising:
a hub that is adapted to be mounted to a crankshaft of an internal combustion engine;
a pulley disposed concentrically about the hub;
an isolation spring coupling the pulley to the hub;
a torsional vibration damper rotationally coupled to the hub and rotationally decoupled from the pulley; and
an electro-adhesive clutch having a clutch input member that is coupled to the pulley, the electro-adhesive clutch being selectively operable for forming an alternate torque path between the pulley and the hub that does not include the isolation spring;
wherein the electro-adhesive clutch comprises a set of discrete electro-adhesive clutch segments having a first clutch segment, which is coupled for rotation with the pulley, and a second clutch segment, which is coupled for rotation with the hub; and
wherein the first and second clutch segments are disposed parallel to one another, extend radially between the hub and the pulley, and are spaced apart from one another along a rotational axis of the hub.

20. The damped isolation pulley of claim 19, wherein each of the first and second clutch segments is shaped as a segment of an annulus or a circle.

21. The damped isolation pulley of claim 19, wherein the electro-adhesive clutch has a clutch output member that is coupled to the torsional vibration damper.

22. The damped isolation pulley of claim 21, wherein the torsional vibration damper includes an inertia ring and wherein the clutch output member is fixedly coupled to the inertia ring.

23. The damped isolation pulley of claim 19, wherein the torsional vibration damper comprises an inertia ring and a spring element that couples the inertia ring to the hub.

24. The damped isolation pulley of claim 23, wherein the spring element comprises at least one elastomeric element.

25. The damped isolation pulley of claim 19,
wherein the first clutch segment is disposed concentrically about the second clutch segment.

26. The damped isolation pulley of claim 19, wherein the isolation spring is at least partly formed of an elastomeric material.

* * * * *